United States Patent
Masunaga et al.

(10) Patent No.: US 9,315,193 B2
(45) Date of Patent: *Apr. 19, 2016

(54) SPEED CHANGE CONTROL SYSTEM FOR VEHICLES

(75) Inventors: Seiji Masunaga, Susono (JP); Yoshio Hasegawa, Chiryu (JP); Seiji Kuwahara, Toyota (JP); Nobufusa Kobayashi, Anjo (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/398,505

(22) PCT Filed: May 8, 2012

(86) PCT No.: PCT/JP2012/061725
§ 371 (c)(1),
(2), (4) Date: Nov. 3, 2014

(87) PCT Pub. No.: WO2013/168225
PCT Pub. Date: Nov. 14, 2013

(65) Prior Publication Data
US 2015/0120154 A1  Apr. 30, 2015

(51) Int. Cl.
*B60W 10/04* (2006.01)
*B60W 10/10* (2012.01)
(Continued)

(52) U.S. Cl.
CPC ............... *B60W 30/19* (2013.01); *B60W 10/04* (2013.01); *B60W 10/11* (2013.01); *F02D 29/00* (2013.01); *F16H 61/06* (2013.01); *F16H 61/061* (2013.01); *F16H 61/684* (2013.01); *B60W 2710/1016* (2013.01); *F16H 2059/405* (2013.01);

(Continued)

(58) Field of Classification Search
CPC ..... B60W 10/10; B60W 10/04; B60W 30/19; B60W 2710/105; F16H 2059/405
See application file for complete search history.

(56) References Cited

U.S. PATENT DOCUMENTS

2008/0017467 A1   1/2008 Honma et al.
2014/0046560 A1*  2/2014 Masunaga et al. .............. 701/58
(Continued)

FOREIGN PATENT DOCUMENTS

JP   2001-227637 A   8/2001
JP   2007-198564 A   8/2007
(Continued)

OTHER PUBLICATIONS

Office Action issued Aug. 13, 2015 in U.S. Appl. No. 14/398,605.
Notice of Allowance issued on Feb. 4, 2016, in U.S Appl. No. 14/398,605.

*Primary Examiner* — Tisha Lewis
(74) *Attorney, Agent, or Firm* — Kenyon & Kenyon LLP

(57) ABSTRACT

A speed change control system for reducing shift shocks of clutch-to-clutch shifting is provided. The control system is applied to a vehicle in which a transmission having a plurality of engagement devices is connected to an output side of a prime mover, and in which a gear stage of the transmission is shifted among a plurality of stages by changing engagement states of the engagement devices. The speed change control system is configured to carry out a clutch-to-clutch shifting of the gear stage from a predetermined gear stage to another gear stage by gradually reducing a torque capacity of the predetermined engagement device to be disengaged while gradually increasing a torque capacity of another engagement device to be engaged.

2 Claims, 3 Drawing Sheets

(51) Int. Cl.
  *F16H 59/40* (2006.01)
  *B60W 30/19* (2012.01)
  *F16H 61/06* (2006.01)
  *F16H 61/684* (2006.01)
  *B60W 10/11* (2012.01)
  *F02D 29/00* (2006.01)
  *F16H 59/42* (2006.01)

(52) U.S. Cl.
  CPC ....... *F16H2059/425* (2013.01); *F16H 2302/00* (2013.01); *F16H 2306/42* (2013.01)

(56) References Cited

U.S. PATENT DOCUMENTS

| | | | |
|---|---|---|---|
| 2014/0200778 A1* | 7/2014 | Ota et al. | 701/54 |
| 2015/0120155 A1 | 4/2015 | Masunaga et al. | |
| 2015/0184740 A1* | 7/2015 | Masunaga et al. | 701/58 |

FOREIGN PATENT DOCUMENTS

| JP | 20080025367 A | 2/2008 |
|---|---|---|
| JP | 2008-051186 A | 3/2008 |
| JP | 2008-057760 A | 3/2008 |

* cited by examiner

SPEED CHANGE CONTROL SYSTEM FOR VEHICLES

CROSS-REFERENCE TO RELATED APPLICATIONS

This is a national phase application based on the PCT International Patent Application No. PCT/JP2012/061725 filed May 8, 2012, the entire contents of which are incorporated herein by reference.

TECHNICAL FIELD

The present invention relates generally to a system for controlling a speed change operation of an automobile, and more particularly, to a system configured to shift a gear stage while engaging or disengaging an engagement device such as a clutch and a brake.

BACKGROUND ART

A speed ratio of an automobile is governed by a mechanism for transmitting torque from a prime mover such as an engine to drive wheels. In general, a gear stage of a vehicle transmission including a forward stage and a reverse stage is selected by selecting a gear pair for transmitting the torque from a plurality of gear pairs by a clutch. Given that the transmission is formed by combining a plurality of planetary gear units, a torque transmission route is changed depending on engagement states of a clutch and a brake. Alternatively, the gear stage of the transmission may also be shifted by changing engagement states of the clutch and the brake thereby changing a reaction element or an output element of the planetary gear unit. In the transmissions of those kinds, the gear stage including the forward stage and the revers stage can be changed by disengaging the engagement device engaged to establish the current gear stage while engaging another engagement device to establish another gear stage. Such method is called "the clutch-to-clutch shifting". However, if torque transmitting capacities of both engagement devices to be engaged and disengaged are insufficient during the clutch-to-clutch shifting, so-called a "retraction" feeling may be caused by a torque drop. By contrast, if torque transmitting capacities of both engagement devices to be engaged and disengaged are excessive, shocks may be caused by a torque reduction resulting from a transmission tie-up.

Therefore, the torque transmitting capacities of the engagement devices to be engaged and disengaged have to be controlled in just proportion. Various kinds of control systems and methods have been proposed for this application. For example, Japanese Patent Laid-Open No. 2008-051186 describes a shift control system. According to the teachings of Japanese Patent Laid-Open No. 2008-051186, a torque of one of clutches involved in the clutch-to-clutch shifting is determined based on a torque sharing rate between a target output torque of a transmission and a torque of said one of the clutches, and a torque of the other clutch is determined based on the torque of said one of the clutches and the target output torque. In addition, the torque of the clutch to be disengaged is reduced gradually in a manner such that the torque becomes zero at a commencement of an inertia phase. Accordingly, the torque will not be applied to the clutch to be disengaged during the inertia phase, and the shifting operation is progressed by increasing hydraulic pressure applied to the clutch to be engaged.

Japanese Patent Laid-Open No. 2001-227637 also describes a control device for automatic transmission configured to change a torque transmitting capacity of the clutch to be engaged in accordance with a change in an input speed during a torque phase of the clutch-to-clutch shifting. If the torque transmitting capacity of the clutch to be engaged is insufficient during the clutch-to-clutch shifting, an engine speed or an input speed is increased while the power is on. By contrast, if the torque transmitting capacity of the clutch to be engaged is excessive, the "retraction" feeling may be caused by a torque drop resulting from the transmission tie-up. In order to avoid such disadvantages, according to the teachings of Japanese Patent Laid-Open No. 2001-227637, the torque transmitting capacity of the clutch to be engaged is increased in case the input speed is increased, and the torque transmitting capacity of the clutch to be engaged is decreased in case the input speed is lowered.

As described, according to the teachings of Japanese Patent Laid-Open No. 2008-051186, the torque transmitting capacity of the clutch to be disengaged or the hydraulic pressure applied thereto is reduced to zero at the commencement of the inertia phase. Therefore, if the torque transmitting capacity of the clutch to be disengaged or the hydraulic pressure applied thereto is increased to a certain extent just before the commencement of the inertia phase, the clutch is disengaged abruptly at the commencement of the inertia phase. In this situation, the torque transmitting capacity of the clutch to be engaged or the hydraulic pressure applied thereto has to be increased abruptly to make up for the reduction in the torque transmitting capacity of the disengaged clutch. Thus, the torque transmitting capacity of the clutch or the hydraulic pressure applied thereto has to be controlled irregularly thereby causing shift shocks.

As also described, the control device taught by Japanese Patent Laid-Open No. 2001-227637 is configured to control the clutch to be engaged during the torque phase of the clutch-to-clutch shifting. According to the teachings of Japanese Patent Laid-Open No. 2001-227637, rotational speeds of rotary members including the engine are changed positively. Therefore, the teachings of Japanese Patent Laid-Open No. 2001-227637 may not be applied to control entire course of the clutch-to-clutch shifting.

DISCLOSURE OF THE INVENTION

The present invention has been conceived noting the foregoing technical problems, and it is therefore an object of the present invention is to provide a speed change control system for a vehicle configured to reduce shift shocks by changing torque and rotational speeds smoothly from a torque phase to an inertia phase under the clutch-to clutch-shifting.

The speed change control system of the present invention is applied to a vehicle in which a transmission having a plurality of engagement devices is connected to an output side of a prime mover. In the transmission, torque capacities of the engagement devices can be changed continuously so that a gear stage of the transmission can be shifted among a plurality of stages by changing engagement states of the engagement devices. Basically, the speed change control system is configured to carry out a clutch-to-clutch shifting of the gear stage from a predetermined gear stage to another gear stage by gradually reducing a torque capacity of the predetermined engagement device to be disengaged while gradually increasing a torque capacity of another engagement device to be engaged. In order to achieve the above-explained object, according to the present invention, the control system is provided with a torque calculation means that calculates a target torque capacity of the engagement device to be engaged during a torque phase and an inertia phase under the clutch-toclutch shifting, based on a target input angular acceleration of the transmission, a target output angular acceleration of the transmission, a target torque capacity of the engagement device to be disengaged, and a target output torque. In addition, the control system is configured to change the target torque capacity of the engagement device to be disengaged continuously from the torque phase to the inertia phase under the clutch-to-clutch shifting.

The speed change control system of the present invention is further provided with an output torque calculation means that calculates an output torque of the prime mover during the torque phase and the inertia phase under the clutch-to-clutch shifting, based on the target input angular acceleration of the transmission, the target output angular acceleration of the transmission, the target torque capacity of the engagement device to be disengaged, and the target output torque.

That is, according to the present invention, a common arithmetic expression is used to calculate the target torque capacity of the engagement device to be engaged during the torque phase and the inertia phase under the clutch-to-clutch shifting. In addition, the target torque capacity of the engagement device to be disengaged that is used in the expression is changed continuously from the torque phase to the inertia phase under the clutch-to-clutch shifting. Therefore, the torque capacities of the engagement devices to be engaged and to be disengaged will not be changed abruptly so that the drive torque can be prevented from being changed abruptly. For this reason, shift shocks resulting from the clutch-to-clutch shifting can be reduced.

In order to further reduce the shift shocks and damage of the engagement devices, the control system of the present invention is further configured to control the output torque of the prime mover in addition to control the target torque capacity of the engagement device to be engaged.

BEST MODE FOR CARRYING OUT THE INVENTION

Figure 3:
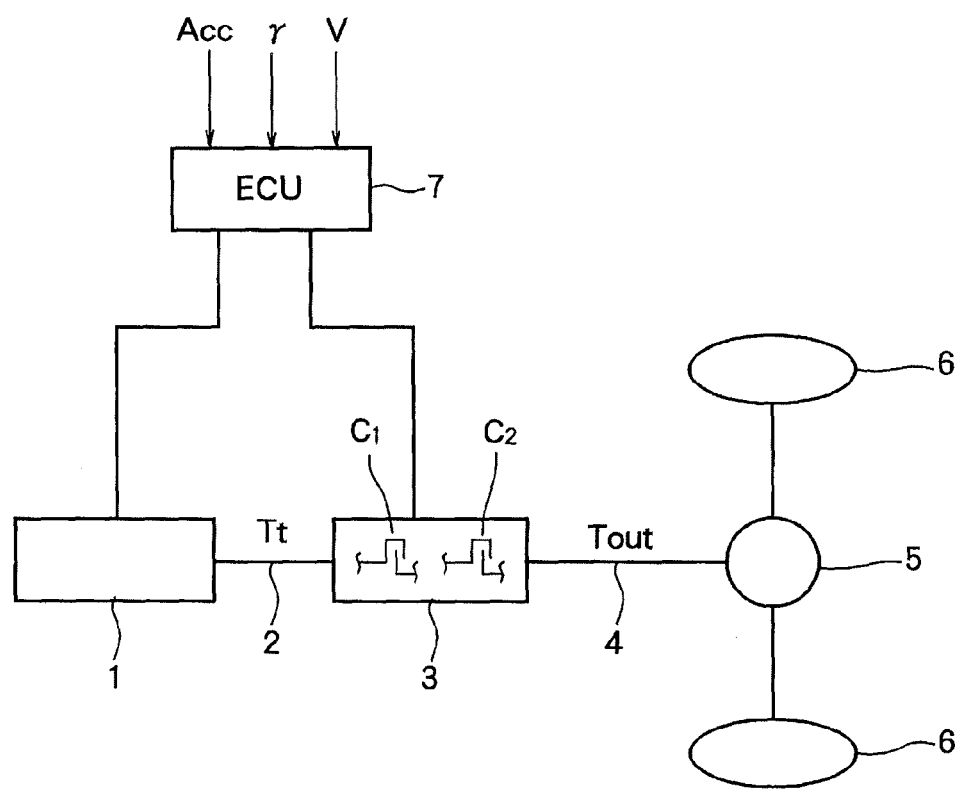
FIG. 3 is a block diagram schematically showing one example of a control system of a vehicle to which the present invention is applied.

The present invention is directed to a control system for a clutch-to clutch shifting of an automatic transmission of a vehicle. FIG. 3 is a block diagram schematically illustrating a preferred example of the vehicle to which the control system applied. As shown in FIG. 3, an automatic transmission 3 is connected to a prime mover 1 through an output shaft 2. According to the preferred example, the prime mover 1 includes an internal combustion engine such as a gasoline engine and a diesel engine, a motor, and a hybrid power source having the engine and the motor. For example, given that the gasoline engine is employed as the prime mover 1, the prime mover 1 is provided with an electronic throttle valve to electrically control an output torque thereof. In this case, specifically, the output torque is generated according to an air intake by electrically controlling an opening degree of the electronic throttle valve, and the output torque is changed temporarily by delaying or advancing an ignition timing by changing a crank angle. Thus, in the vehicle shown in FIG. 3, the prime mover 1 is employed to generate a torque applied to the automatic transmission 3. Accordingly, the prime mover 1 includes a torque converter if available in the vehicle.

In the automatic transmission 3, a predetermined gear stage is established by engaging an engagement device C1, and the gear stage is shifted to another gear stage by engaging another engagement device C2 being disengaged while disengaging the engagement device C1. To this end, not only a clutch device adapted to selectively connect and disconnect rotary members, but also a brake device adapted to selectively connect and disconnect a rotary member to/from a predetermined fixing portion may be used as the engagement device C1 and C2. Thus, a geared transmission is employed as the automatic transmission 3. Here, the automatic transmission 3 is not required to carry out the clutch-to-clutch shift to all of the available gear stage, but required to shift the gear stage only to an intended gear stage(s) by the clutch-to-clutch shifting. Torque capacities of the engagement devices (as will be simply called "the clutch" hereinafter) C1 and C2 are controlled electrically by a hydraulic actuator or an electric actuator. To this end, the automatic transmission 3 is provided with a hydraulic circuit, and a hydraulic pressure therein is controlled using a plurality of electromagnetic valves. Therefore, a speed change operation is carried out by switching an oil passage while controlling the torque capacities of the clutches involving the speed change or establishing the gear stage by the electromagnetic valves. The torque outputted from the output shaft 4 of the automatic transmission 3 is delivered to the differential 5 as a final reduction gear unit, and further transmitted to the drive wheels 6.

In order to control the prime mover 1 and the automatic transmission 3, the control system is provided with an electronic control unit (to be abbreviated as "the ECU" hereinafter) 7 serving as the controller of the present invention. The ECU 7 may be formed by combining control units of the prime mover 1 and the automatic transmission 3. Alternatively, a single microcomputer configured to send control signals to both of the prime mover 1 and the automatic transmission 3 may also be used as the ECU 7. Specifically, the ECU 7 is configured to carry out a calculation based on a preinstalled map, data program etc. and various kinds of incident data. The calculation results are sent to the prime mover 1 and the automatic transmission 3 in the form of command signals. To this end, for example, a shifting diagram for determining the gear stage, a drive force according to a demand of a driver, target angular accelerations of the input shaft 2 and the output shaft 4, a required torque value of the clutch to be disengaged etc. are preinstalled in the form of maps. Those maps are prepared by determining a target value of each of above-mentioned items with respect to a corresponding parameter based on a result of experimentation or simulation. To the contrary, a vehicle speed V, an opening degree Acc of an accelerator, a speed ratio γ etc. are inputted to the ECU 7.

Figure 1:
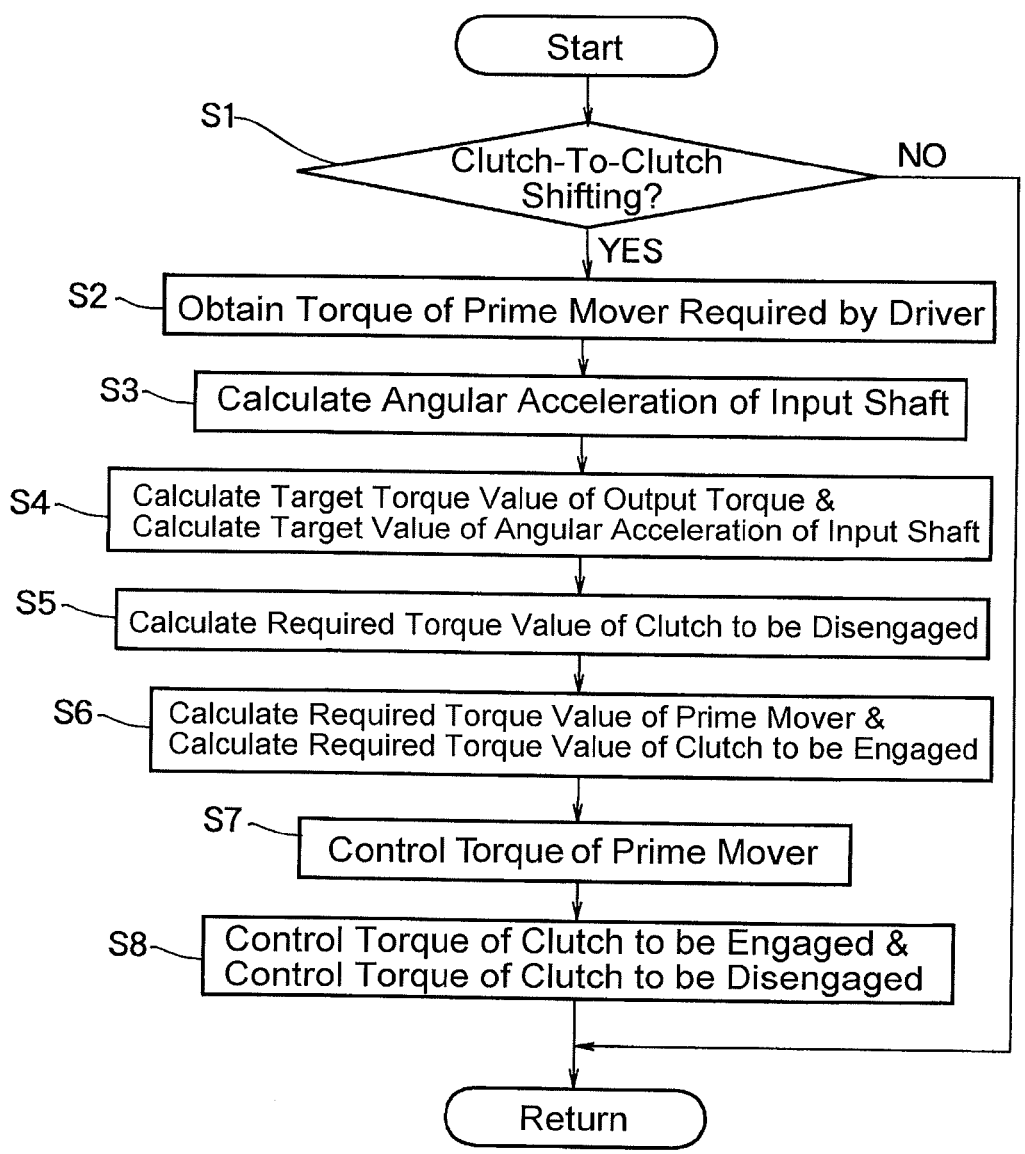
FIG. 1 is a flowchart showing one example of the control carried out by the speed change control system of the present invention.

Referring now to FIG. 1, a preferred example of the control for the clutch-to-clutch shifting to be carried out by the control system according to the present invention will be explained hereinafter. First of all, it is determined whether or not a condition to carry out the clutch-to-clutch shifting is satisfied, in other words, it is determined whether or not a decision to carry out the clutch-to-clutch shifting is made (at step S1). Such decision is made with reference to data about a running condition of the vehicle such as a drive demand represented by the accelerator opening Acc and the vehicle speed, and to the preinstalled shifting diagram. Specifically, the ECU 7 determines to carry out a shifting operation based on a fact that the running condition of the vehicle is shifted from a predetermined speed region to another speed region in the shifting diagram. If the shifting operation thus determined is to be carried out to shift the gear stage from the gear stage being established by engaging the predetermined clutch to the gear stage to be achieved by disengaging the clutch while engaging another clutch, the ECU 7 determines to carry out the clutch-to-clutch shifting.

If the clutch-to-clutch shifting is not to be carried out so that the answer of step S1 is NO, the routine is returned without carrying out any specific control. By contrast, if the answer of step S1 is YES, a torque of the prime mover 1 required by the driver is obtained (at step S2). The required drive force to be generated according to an opening degree of the accelerator with respect to the vehicle speed is governed by a design of the vehicle. To this end, therefore, the required drive force is preinstalled in the form of map using the vehicle speed V and the accelerator opening Acc as parameters, and the required drive force is determined with reference to the map. Accordingly, an estimated value of current torque of the prime mover 1 may also be employed at step S2. Further, a target power of the prime mover 1 is determined based on the required (or estimated) drive force and the vehicle speed. On the other hand, a speed of the prime mover 1 is determined based on predetermined constants such as the vehicle speed V, the speed ratio $\gamma$, a gear ratio of the differential 5 etc. Therefore, the torque of the prime mover 1 can be calculated by dividing the target power by the speed. Thus, at step S2, the torque of the prime mover required by the driver is calculated.

Then, an angular acceleration of the output shaft 4 is calculated (at step S3). As described, the output shaft 4 is connected to the drive wheels 6 through the deferential 5. That is, the angular acceleration of the output shaft 4 corresponds to an acceleration of the vehicle. Therefore, the angular acceleration of the output shaft 4 can be obtained based on a rate of change in a detection value of the acceleration corresponding to the vehicle speed V. Specifically, the angular acceleration of the output shaft 4 is obtained by measuring a rotational speed of the output shaft 4 by a speed sensor arranged in the automatic transmission 3, and by applying a signal processing such as a differential processing to the measured speed.

Next, a target torque value of the output shaft 4 and a target value of the angular acceleration of the input shaft 2 are calculated (at step S4). The rotational speed of the input shaft 2 or the prime mover 1, and the torque of the output shaft 4 are changed according to the speed ratio to be achieved after the speed change operation. If those changes are caused abruptly, a shift shock will be worsened. By contrast, if it takes too long to change those speed and torque, a shifting response is worsened to provide the driver with an uncomfortable feeling. In addition, the engagement devices will be worn out. In order to avoid such disadvantages, in general, changes in the torque of the output shaft and the rotational speed of the input shaft are controlled to be completed within a preset shifting time. For this purpose, as described in the above-mentioned Japanese Patent Laid-Open No. 2008-051186, a target value of the output shaft torque may be determined in the form of a time function or change pattern (i.e., a waveform) of the target output torque. On the other hand, the target output torque can be calculated by multiplying an estimated input torque of the automatic transmission 3 (i.e., the torque of the prime mover) by the speed ratio $\gamma$, the gear ratio of the differential 5, a power transmission efficiency and so on. Since an inertia torque is caused during the inertia phase by changes in rotational speeds of the rotary members of the prime mover 1 and the automatic transmission 3, the target output torque is determined taking account of the inertia torque. Therefore, the routine shown in FIG. 1 may also be carried out to determine a commencement of the inertia phase. In this case, the commencement of the inertia phase can be determined based on a fact that the rotational speed of the input shaft deviates from a speed achieved by the speed ratio and the vehicle speed of before the shifting operation (or an output shaft speed) to a speed exceeding a predetermined reference speed.

Thus, the rotational speed of the input shaft is changed from the speed achieved by the speed ratio and the vehicle speed of before the shifting operation to a speed achieved by the speed ratio and the vehicle speed of after the shifting, and such change in the rotational speed is completed within the preset time. Accordingly, the target value of the angular acceleration can be obtained based on an amount of change in the rotational speed of the input shaft and a shifting time. The target value of the angular acceleration of the input shaft may be preinstalled in the form of a map for each vehicle speed V and shifting pattern, and calculated with reference to the map.

Then, a required torque value of the clutch to be disengaged is calculated (at step S5). As described, under the clutch-to-clutch shifting, one of the engagement devices is engaged while disengaging the other engagement device. Therefore, according to the control example shown in FIG. 1, the torque capacity of the clutch to be disengaged is determined first of all, and then the torque capacity of the clutch to be engaged and the required torque value of the prime mover 1 are determined based on the calculated torque capacity of the clutch to be disengaged. In addition, the required torque value of the clutch to be disengaged is changed continuously across the termination of the torque phase, that is, across the commencement of the inertia phase. Accordingly, the required torque value of the clutch to be disengaged may also be preinstalled in the form of a map where the required torque value is determined with respect to the shifting pattern and the vehicle speed V or the accelerator opening Acc.

An order of the foregoing steps S2 to S5 may be switched according to need. That is, if data obtained at the preceding step will not be used at the subsequent steps, the order to carry out steps S2 to S5 may be changed from that shown in FIG. 1.

Then, a required torque value of the prime mover and a required torque value (i.e., a required torque capacity) of the clutch to be engaged are calculated based on the data obtained at the preceding steps. Specifically, the required torque value of the prime mover and the required torque capacity of the clutch to be engaged during the torque phase and the inertia phase under upshifting are calculated using the following arithmetic expression (1):

$$\begin{bmatrix} T_t \\ T_{chi} \end{bmatrix} = \frac{1}{a_1 c_2 - c_1 a_2} \begin{bmatrix} c_2(\dot{\omega}_t - b_1 T_{clow} - d_1 \dot{\omega}_o) - c_1(T_o - b_2 T_{clow} - d_2 \dot{\omega}_o) \\ -a_2(\dot{\omega}_t - b_1 T_{clow} - d_1 \dot{\omega}_o) + a_1(T_o - b_2 T_{clow} - d_2 \dot{\omega}_o) \end{bmatrix}. \quad (1)$$

On the other hand, the required torque value of the prime mover and the required torque capacity of the clutch to be engaged during the torque phase and the inertia phase under downshifting are calculated using the following arithmetic expression (2):

$$\begin{bmatrix} T_t \\ T_{clow} \end{bmatrix} = \quad (2)$$

-continued $$\frac{1}{a_1b_2 - b_1a_2}\begin{bmatrix} b_2(\dot{\omega}_t - c_1T_{chi} - d_1\dot{\omega}_o) - b_1(T_o - c_2T_{chi} - d_2\dot{\omega}_o) \\ -a_2(\dot{\omega}_t - c_1T_{chi} - d_1\dot{\omega}_o) + a_1(T_o - c_2T_{chi} - d_2\dot{\omega}_o) \end{bmatrix}.$$

Those expressions (1) and (2) are derived from the following conventional equation of motion for the gear train of the automatic transmission 3:

$$\begin{bmatrix} \dot{\omega}_t \\ T_o \end{bmatrix} = \begin{bmatrix} a_1 & b_1 & c_1 & d_1 \\ a_2 & b_2 & c_2 & d_2 \end{bmatrix} \begin{bmatrix} T_t \\ T_{clow} \\ T_{chi} \\ \dot{\omega}_o \end{bmatrix} \quad (3)$$

where $\omega_t$ dot ($d\,\omega_t/d_t$) is the target value of the angular acceleration of the input shaft calculated at step S4, $\omega_o$ dot ($d\,\omega_o/d_t$) is the angular acceleration of the output shaft calculated at step S3, $T_o$ is the target torque of the output shaft calculated at step S4, $T_t$ is the torque of the prime mover calculated at step S2, $T_{clow}$ is a torque of the clutch engaged under the gear stage of low speed side established before the shifting or to be established after the shifting, $T_{chi}$ is a torque of the clutch engaged under the gear stage of high speed side established before the shifting or to be established after the shifting, and a1, a2, b1, b2, c1, c2, d1 and d2 are predetermined constants used in the equation of motion for the gear train of the automatic transmission 3.

Thus, the above-mentioned expression (1) is used to calculate the required torque value $T_t$ of the prime mover and the required torque value $T_{chi}$ of the clutch to be engaged under upshifting commonly during the torque phase and the inertia phase. Also, the above-mentioned expression (2) is used to calculate the required torque value $T_t$ of the prime mover and the required torque value $T_{clow}$ of the clutch to be engaged under downshifting commonly during the torque phase and the inertia phase. As described, the required torque values $T_{chi}$ and $T_{clow}$ of the clutch to be engaged calculated by those expressions are changed continuously across the termination of the torque phase, that is, across the commencement of the inertia phase. Therefore, the required torque value $T_t$ of the prime mover and the required torque value $T_{chi}$ of the clutch to be engaged under upshifting, and the required torque value $T_t$ of the prime mover and the required torque value $T_{clow}$ of the clutch to be engaged under downshifting are also changed continuously across the termination of the torque phase, that is, across the commencement of the inertia phase.

Then, the controller sends those required torque values $T_t$, $T_{chi}$ and $T_{clow}$ in the form of command signals to control the torque of the prime mover (at step S7), and to control the torque of the clutch to be engaged and the torque of the clutch to be disengaged (at step S8). To this end, if the prime mover is a gasoline engine, the torque thereof can be controlled by delaying an ignition timing by changing a crank angle, or by controlling an opening degree of the throttle valve. On the other hand, the torque of each clutch can be controlled by controlling an engagement pressure applied thereto.

Figure 2:
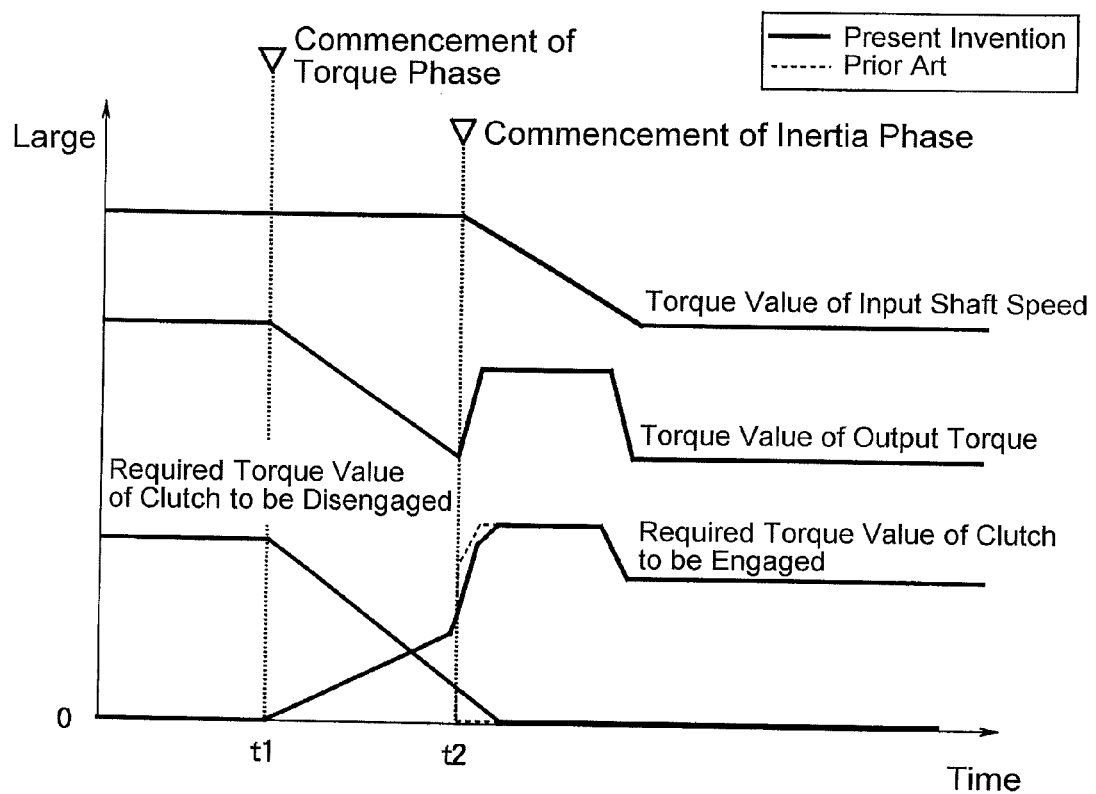
FIG. 2 is a timechart showing one example of a change in required torque values of clutches during execution of the control shown in FIG. 1 under power-on-upshifting.

Changes in the required torque values of the clutches under the power-on-upshifting carried out by the above-explained procedures are indicated in the time chart shown in FIG. 2. When the decision to carry out the clutch-to-clutch shifting is made at a point t1, the required torque value of the clutch to be disengaged starts lowering, and at the same time, the required torque value of the clutch to be disengaged starts increasing. That is, the torque phase commences. In this case, the target value of the input shaft speed is determined in a manner to maintain the rotational speed of the input shaft, and the target value of the output shaft torque is set to a value that reduces the output shaft torque at a predetermined gradient to the torque to be achieved under the gear stage to be established after the shifting. Accordingly, the torque of the clutch to be engaged is calculated by the above-mentioned expression (1) using those values, and gradually increased as indicated in FIG. 2.

Then, after the torque of the clutch to be disengaged is lowered and the torque of the clutch to be engaged is increased so that the torque transmitted through a route setting the gear stage to be established after the shifting is increased to a certain extent, the inertia phase commences (at point t2). In this situation, the target value of the input shaft speed is reduced gradually at a predetermined gradient toward a value to be determined by the speed ratio and the vehicle speed of after shifting. Specifically, such commencement of the inertia phase can be determined based on a fact that the input shaft speed deviates to a certain extent from a speed determined based on the vehicle speed and the speed ratio. During the inertia phase, the rotational speeds of the rotary members including the prime mover 1 are changed thereby producing the inertia torque acting on the output shaft. Therefore, the target torque value of the output shaft is determined taking account of such inertia torque. In addition, the required torque value of the clutch to be disengaged is reduced smoothly to be zero after the commencement of the inertia phase across the point t2 at which the inertia phase commences.

As in the torque phase, the required torque value of the clutch to be engaged is calculated using the above-explained expression even after the commencement of the inertia phase. Therefore, as shown in FIG. 2, the required torque value of the clutch to be engaged is changed continuously during the upshifting with the reduction in the target value of the input shaft speed and the augmentation in the target torque value of the output shaft. For this reason, the required torque values of the clutches to be engaged and disengaged will not be changed abruptly or stepwise. That is, the shift shocks will not be worsened. For reference, in FIG. 2, changes in the required torque values of the clutches to be engaged and disengaged caused by carrying out the control taught by Japanese Patent Laid-Open No. 2008-051186 are indicated by broken lines. As indicated by the broken lines, according to the prior art, the required torque value of the clutch to be disengaged is reduced to zero at the commencement of the inertia phase. Consequently, the required torque value of the clutch to be engaged is increased abruptly to cause shift shocks.

Thus, according to the preferred example, the torque of the prime mover 1 is controlled by obtaining the required torque value of the prime mover in addition to the required torque value of the clutch to be disengaged. However, the control system of the present invention may be modified to control torque capacity of the clutch to be engaged by calculating the required torque value of the clutch to be engaged without calculating the required torque value of the prime mover. In addition, although the example to control the required torque values of the clutches under power-on-upshifting is shown in FIG. 2, the shift shocks may also be reduced by the foregoing speed change control of the present invention under power-off-upshifting, power-on-downshifting and power-off-upshifting.

Here will be briefly explained a relation between the preferred example and the present invention. The functional means of the ECU 7 to carry out the control of step S6 shown in FIG. 1 serves as the torque calculation means or the output torque calculation means of the present invention.

The invention claimed is:

1. A speed change control system, that is applied to a vehicle in which a transmission having a plurality of engagement devices whose torque capacities are changed continuously is connected to an output side of a prime mover, and in which a gear stage of the transmission is shifted among a plurality of stages by changing engagement states of the engagement devices, and that is configured to carry out a clutch-to-clutch shifting of the gear stage from a predetermined gear stage to another gear stage by gradually reducing a torque capacity of the predetermined engagement device to be disengaged while gradually increasing a torque capacity of another engagement device to be engaged, comprising:

a torque calculator that calculates a target torque capacity of the engagement device to be engaged during a torque phase and an inertia phase under the clutch-to-clutch shifting using a common arithmetic expression, based on a target input angular acceleration of the transmission, a target output angular acceleration of the transmission, a target torque capacity of the engagement device to be disengaged, and a target output torque; and wherein the target torque capacity of the engagement device to be disengaged is changed continuously from the torque phase to the inertia phase under the clutch-to-clutch shifting.

2. The speed change control system as claimed in claim 1, further comprising:

an output torque calculator that calculates an output torque of the prime mover during the torque phase and the inertia phase under the clutch-to-clutch shifting, based on the target input angular acceleration of the transmission, the target output angular acceleration of the transmission, the target torque capacity of the engagement device to be disengaged, and the target output torque.

\* \* \* \* \*